M. BROWNELL.
Evaporator.
No. 213,971. Patented April 8, 1879.
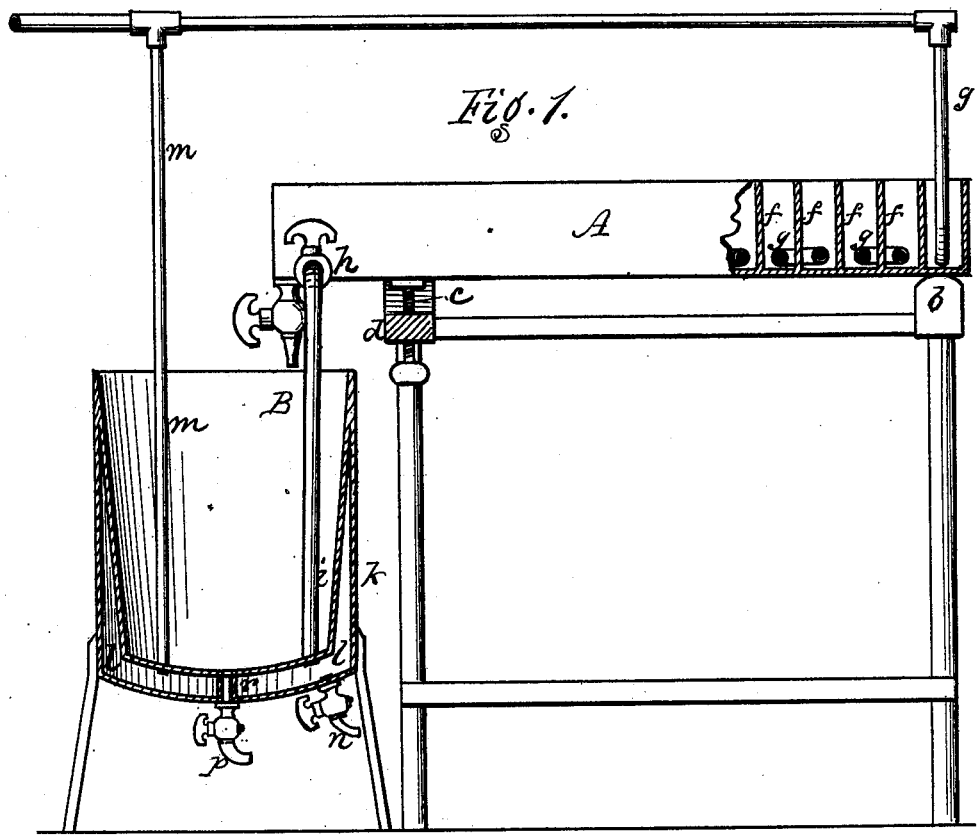
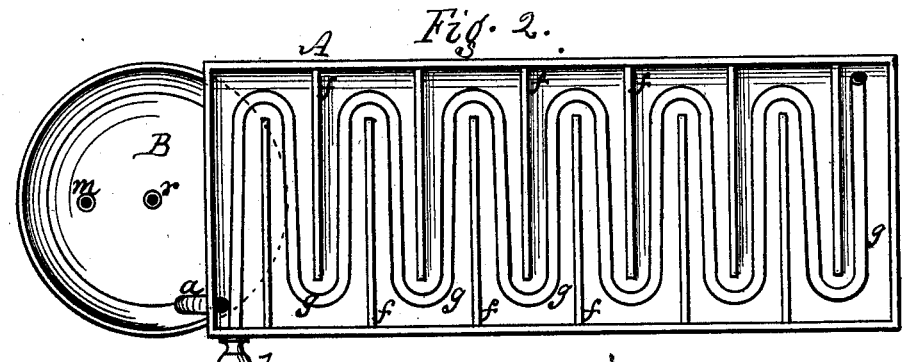
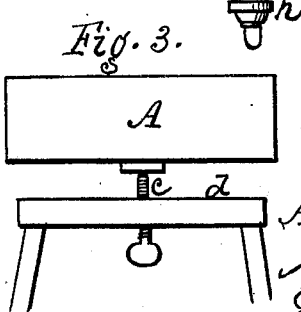
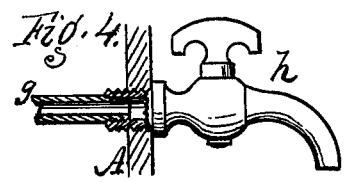
Attest. Inventor.
Abner Burbank Merritt Brownell
Jacob Spuler per R. F. Osgood,
Atty.

UNITED STATES PATENT OFFICE.

MERRITT BROWNELL, OF RUSHVILLE, NEW YORK.

IMPROVEMENT IN EVAPORATORS.

Specification forming part of Letters Patent No. 213,971, dated April 8, 1879; application filed December 21, 1878.

*To all whom it may concern:*

Be it known that I, MERRITT BROWNELL, of Rushville, in the county of Yates and State of New York, have invented a certain new and useful Improvement in Evaporators; and I do hereby declare that the following is a full, clear, and exact description of the same, reference being had to the accompanying drawings, in which—

Figure 1 is a sectional side elevation of my improvement. Fig. 2 is a plan of the same. Fig. 3 is an end elevation of the upper evaporating-pan, showing the method of adjusting the same. Fig. 4 is a view of the steam-pipe connection with the cock.

My improvement relates to apparatus for evaporating liquids, such as cider, cane-juice, maple-sap, &c.

The invention consists in the combination of an evaporating-pan and a reducing-tank, arranged one above the other, so that the contents of the pan will be discharged into the tank, and the pan having at its eduction end an adjusting device consisting of a screw resting in a bearing, by which means the pan may be adjusted to discharge its contents into the tank more or less rapidly, as hereinafter more fully described.

A represents the evaporating-pan, and B the reducing-tank, situated one above the other, as shown, so that the liquid, after it has passed through the pan and has been evaporated to a certain degree approaching semi-liquid, is discharged through cock $a$ into the tank, where it is held in body and subjected to a slower degree of evaporation to reduce it to the denser consistency, this process being found most effective in evaporating many liquids, and especially cider, as thereby a much finer product is produced.

The evaporating-pan A rests at the induction end loosely upon a support, $b$, or it may be pivoted at that point. At the opposite or eduction end it rests upon an adjusting-screw, $c$, which passes up through a fixed bearing, $d$, by which the pan may be inclined more or less to produce a more or less rapid flow of the liquid through the pan and into the tank.

The pan is provided with the ordinary zigzag partitions $f\ f\ f$, to produce an indirect flow of the liquid, and through the channels thus formed are laid coils of steam-pipe $g\ g\ g$, through which steam is passed for heating the liquid. No fire is applied to the pan; hence there is no danger of burning the contents, even if overheat is produced. At the eduction or discharge end the steam-pipe $g$ is attached directly to the inner end of the discharge-cock $h$, which passes out through the side of the pan. The attachment is preferably made by a coupling, so that none of the contents of the pan can escape into the cock. This direct attachment of the steam-pipe to the discharge-cock serves a double purpose: First, it allows the direct discharge of the waters of condensation from the pipe, and, second, the cock serves as a check to the steam in the pipe and to regulate the heat in the pan exactly as desired, and saves the use of a separate and independent check-valve, which is ordinarily used in steam-pipes to control the steam.

The tank B consists of two vessels, $i\ k$, situated one within the other, and leaving a jacket-space, $l$, between them extending nearly or quite to the top, as shown. Steam is admitted into this space by pipe $m$, and is discharged by cock $n$, which also regulates the heat. The two steam-pipes $g\ m$ may be connected with a single main pipe extending to the boiler, and, if desired, the steam from cock $h$ may be admitted into a pipe, so as to pass into the jacket-space of the tank instead of escaping independently, as shown. The bottom of the tank is made crowning or convex, as shown, and the contents of the tank are drawn off by a cock, $p$, which connects by a tube, $r$, with the interior of the tank.

By the arrangement above described the liquid may be run rapidly through the pan, and be deprived of its more aqueous matter with great rapidity, and then, while held in body in the tank, be subjected to a slower action, by which a much better result is produced. The action is also much more expeditious than where a single vessel is used. The single pan or the tank may, however, be advantageously used for some purposes. They may be used together or separate. The evaporation or reduction of liquids in this apparatus may be carried to the highest extent without danger of burning, even to such an extent that the boiling runs over the pan, since only steam is applied and no fire comes in contact with the apparatus; yet by turning the discharge-cocks for the steam the heat is at once controlled and brought down to the desired temperature almost instantly. In case the steam from cock $h$ is carried by a pipe into the jacket-space $l$ of the tank a coupling or other attachment is provided to allow sliding of the pipe to enable the evaporating-pan to be adjusted, as before described.

I claim—

In an evaporator, the combination of the evaporating-pan A, provided with coils of steam-pipe, and made adjustable at the eduction end by screw $c$, resting on bearing $d$, and the reducing-tank B, provided with the steam jacket-space $l$, arranged as described, whereby the liquid is first passed through the pan to evaporate the more aqueous matter, and then is received in the tank to reduce it to the heavier consistency, as herein described.

In witness whereof I have hereunto signed my name in the presence of two subscribing witnesses.

MERRITT BROWNELL.

Witnesses:
R. F. OSGOOD,
R. E. WHITE.